(12) United States Patent
Oshima et al.

(10) Patent No.: US 7,423,809 B2
(45) Date of Patent: Sep. 9, 2008

(54) REFLECTIVE SCREEN

(75) Inventors: Yoshihiro Oshima, Gifu (JP);
Masayasu Kakinuma, Miyagi (JP);
Hideya Chubachi, Miyagi (JP); Hiroshi Hayashi, Miyagi (JP); Kazuhito Shimoda, Kanagawa (JP); Shina Kirita, Tokyo (JP)

(73) Assignee: Sony Corporation, Tokyo (JP)

( * ) Notice: Subject to any disclaimer, the term of this patent is extended or adjusted under 35 U.S.C. 154(b) by 196 days.

(21) Appl. No.: 11/153,961

(22) Filed: Jun. 16, 2005

(65) Prior Publication Data

US 2005/0280898 A1 Dec. 22, 2005

(30) Foreign Application Priority Data

Jun. 16, 2004 (JP) .................... P2004-178007

(51) Int. Cl.
*G03B 21/56* (2006.01)
*G03B 21/60* (2006.01)
(52) U.S. Cl. .................... 359/459; 359/443; 359/454
(58) Field of Classification Search ........... 359/443, 359/459, 454
See application file for complete search history.

(56) References Cited

U.S. PATENT DOCUMENTS

| 5,693,446 | A | * | 12/1997 | Staral et al. ............ 430/201 |
| 2001/0150883 | | | 8/2004 | Shimoda et al. |
| 2004/0233524 | A1 | * | 11/2004 | Lippey et al. ............ 359/443 |
| 2005/0018265 | A1 | | 1/2005 | Atsuumi et al. |

FOREIGN PATENT DOCUMENTS

| JP | 05-273655 | 10/1993 |
| JP | 2003270725 | 9/2003 |
| WO | 03/077027 | 9/2003 |

* cited by examiner

*Primary Examiner*—Diane Lee
*Assistant Examiner*—Magda Cruz
(74) *Attorney, Agent, or Firm*—Bell, Boyd & Lloyd LLP (57) ABSTRACT

A reflective screen is provided. A reflective screen that displays an image by reflecting light from a light source includes a reflective sheet, a light-scattering sheet, and an adhesive layer bonding the reflective sheet to the light-scattering sheet. The adhesive layer contains a coloring material that absorbs light in a particular wavelength region.

11 Claims, 6 Drawing Sheets

REFLECTIVE SCREEN

CROSS REFERENCES TO RELATED APPLICATIONS

The present application claims priority to Japanese Patent Application JP 2004-178007 filed in the Japanese Patent Office on Jun. 16, 2004, the entire contents of which are incorporated herein by reference.

BACKGROUND

The present invention relates to reflective screens. In particular, it relates to a wavelength-selective reflective screen onto which an image from a projector, such as a video projector, a film projector, or an overhead projector, is projected with excellent color reproducibility and a high contrast even in a bright environment.

Recent years have seen widespread use of overhead and slide projectors by presenters delivering their materials in conferences and the like. Liquid crystal video projectors and motion picture film projectors for home use are also gaining popularity. These projectors operate by optically modulating light emitted from a light source using, for example, a liquid crystal panel, to form imaging light and then throwing the imaging light through an optical system, such as a lens, onto a screen.

For example, a front projector that forms a color image on a screen includes an illuminating optical system for splitting light emitted from a light source into red (R), green (G), and blue (B) beams and converging these beams onto predetermined optical paths, a liquid crystal panel (light valves) for optically modulating the respective red, green, and blue beams split in the illuminating optical system, and an optical combinatory unit for combining the R, G, and B beams optically modulated with the liquid crystal panel. A color image produced in the optical combinatory unit is enlarged and projected onto a screen via a projection lens.

A more recent development provides a projector that uses a narrowband light source of three primary colors and a grating light valve (GLV) instead of the liquid crystal panel to spatially modulate the respective RGB beams.

The projectors described above use projection screens to provide images. Projection screens can be roughly categorized into transmissive screens and reflective screens. With transmissive screens, light is emitted from behind the screen to present images to users sitting in front of the screen. With reflective screens, light is emitted from the front of the screen to deliver users images formed by reflected light. In order for the screens of any type to exhibit high visibility, formation of bright, high-contrast images is desirable.

However, unlike emission displays or rear projectors, front projectors can rarely reduce reflection of ambient light using, for example, an ND filter. Thus, it has been difficult to increase the bright area contrast of the front projectors on reflective screens.

A proposal for overcoming this problem provides a reflective screen incorporating an optical thin film (optical laminate) including a dielectric laminate that exhibits high reflection properties to light in particular wavelength regions and high transmission properties at least to light in the visible wavelength region outside those particular wavelength regions. In this screen, the thicknesses of optical films constituting the dielectric laminate are designed by a matrix simulation. An example of such proposal is found in Japanese Unexamined Patent Application Publication No. 2003-270725.

In the above-described screen, the optical laminate serves as a spectrum filter, which reflects most of light in particular wavelength regions. For example, the optical laminate transmits most of incident ambient light outside those particular wavelength regions.

As is described above, this reflective screen can selectively reflect light of particular wavelengths and reduces the reflection of ambient light compared to typical screens. Accordingly, a decrease in contrast of images formed on the screen can be suppressed, reflection of ambient light can be effectively reduced, and bright images can be obtained. Moreover, according to this reflective screen, clear images can be obtained in a bright environment, and thus clear images can be produced irrespective of the brightness of the environment. In particular, remarkably high contrast can be achieved with light sources, such as GLV, having a steep spectrum with a half width smaller than the half width of the reflectance of the screen in particular wavelength regions. Thus, the capacity of the light source can be fully yielded.

An LCD projector incorporating a high-pressure mercury lamp (UHP lamp) suffers from poor white balance of the imaging light despite the use of the reflective screen described above.

A reflective screen that can adjust the balance among three primary colors (RGB) in the imaging light and increase the purity of RGB to thereby extend the color gamut is desired.

SUMMARY

The present invention relates to reflective screens. In particular, it relates to a wavelength-selective reflective screen onto which an image from a projector, such as a video projector, a film projector, or an overhead projector, is projected with excellent color reproducibility and a high contrast even in a bright environment.

The present inventors have investigated the cause of the problems described above and found that the poor RGB balance and low color reproducibility are caused by the UHP lamp serving as a light source of the projector. In detail, the light generated by the UHP lamp originally has a low intensity in the red wavelength region and a broad spectrum. Thus, light in the red wavelength region, which is desired in the imaging light from the light source, is trimmed, resulting in poor RGB balance. The present inventors have conducted extensive studies to overcome this problem and made the present invention.

An embodiment of the invention provides a reflective screen that displays an image by reflecting light from a light source, the reflective screen including a reflective sheet, a light-scattering sheet, and an adhesive layer bonding the reflective sheet to the light-scattering sheet. The adhesive layer contains a coloring material that absorbs light in a particular wavelength region.

Another embodiment of the present invention provides a reflective screen that displays an image by reflecting light from a light source, the reflective screen including a reflective sheet and a light-scattering sheet disposed on the reflective sheet. The light-scattering sheet contains a coloring material that absorbs light in a particular wavelength region.

With such structures, light components in light incident on and reflected at the reflective sheet in the particular wavelength region can be absorbed without providing an additional layer onto a reflective screen. Thus, imaging light which excels in color reproducibility can be obtained.

Preferably, the coloring material absorbs green light. Since the light component having a high intensity in the light projected from a projector light source having poor color balance can be absorbed, good color balance can be achieved. In particular, such a coloring material makes the screen particularly suitable for use with a UHP lamp.

Preferably, the reflective sheet has high reflecting properties to light in particular wavelength regions and absorbing properties to light in a visible wavelength region but outside the particular wavelength regions.

For example, the reflective sheet may include an optical laminate including a dielectric layer and a light-absorbing thin film having a transmitting property; and a reflecting layer for reflecting light transmitted through the optical laminate.

Preferably, the reflective sheet includes an optical laminate including at least one high refractive index layer and at least one low refractive index layer alternately disposed, the low refractive index layer having a refractive index lower than that of the high refractive index layer; and an absorbing layer that absorbs light transmitted through the optical laminate.

More preferably, the particular wavelength regions respectively include a red wavelength region, a green wavelength region, and a blue wavelength region.

In this manner, reflection of ambient light can be significantly reduced. Thus, the decreased contrast of the image on the projector screen and the reflection of ambient light can be effectively prevented, and a bright image having excellent color reproducibility can be obtained. An image having superior color reproducibility can be obtained by determining the type and the amount of the color material based on the intensity distribution of the light source spectrum and the reflecting properties of the reflective sheet.

Additional features and advantages of the present invention are described in, and will be apparent from, the following Detailed Description and the figures.

DETAILED DESCRIPTION OF THE INVENTION

Reflective screens of preferred embodiments of the present invention will now be described. Note that the present invention is not limited by the description below and various modification and alternation are possible without departing from the scope of the present invention.

Figure 1:
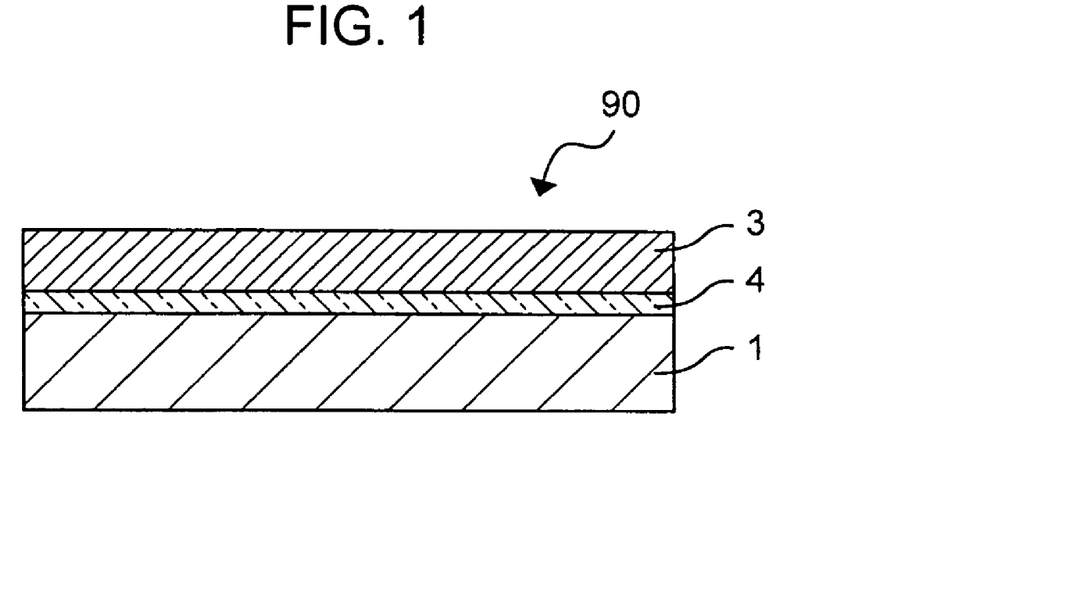
FIG. 1 is a cross-sectional view of a reflective screen in an embodiment of the present invention is based.

First, the structure of a reflective screen on which the present invention is based is described. FIG. 1 is a partial cross-sectional view of the reflective screen. A reflective screen 90 includes a reflective sheet 1, a light-scattering sheet 3, and an adhesive layer 4 that bonds the reflective sheet 1 and the light-scattering sheet 3.

The reflective sheet 1 reflects light in a plurality of predetermined wavelength regions, i.e., projector light or imaging light, and absorbs light in the visible wavelength region outside these predetermined wavelength regions. The predetermined wavelength regions preferably include those of the three primary colors, red, green and blue.

Figure 2:
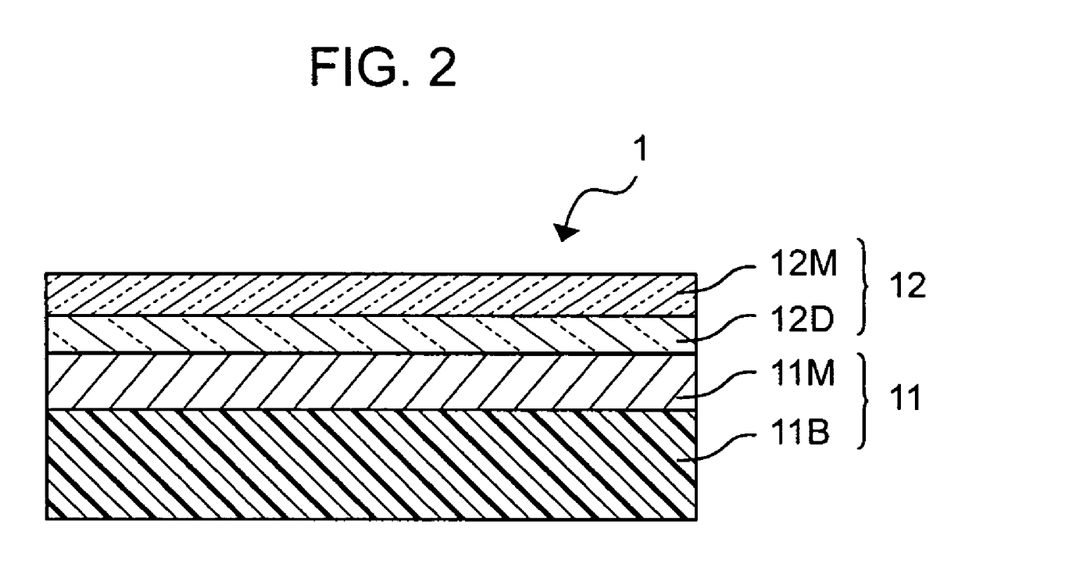
FIG. 2 is a cross-sectional view of optical films of a reflective sheet 1.

FIG. 2 shows an example of the reflective sheet 1. The reflective sheet 1 includes a reflective layer 11 and an optical laminate 12 including a dielectric film 12D and a light absorbing thin film 12M having a transmitting property.

The reflective layer 11 is constituted from a substrate 11B and a metal film 11M on the substrate 11B and reflects light transmitted through the optical laminate 12.

The substrate 11B serves as a supporting member for the reflective sheet 1. The substrate 11B is composed of, for example, a flexible polymer, such as polycarbonate (PC), polyethylene terephthalate (PET), polyethylene naphthalate (PEN), polyethersulfone (PES), or polyolefin (PO).

The metal film 11M may be composed of a metal that reflects visible light at high reflectance. For example, the metal film 11M may be composed of Al, Au, or Ag and may have a thickness of 50 nm or more. The metal film 11M may be formed on the substrate 11B by any technique, e.g., vapor deposition, plating, or application. Alternatively, instead of the reflective layer 11 constituted from the substrate 11B and the metal film 11M, a metal substrate composed of the same material as the metal film 11M may be used.

The optical laminate 12 has a selective reflecting property and includes at least two layers including the dielectric film 12D and the light absorbing thin film 12M having a transmitting property. The optical laminate 12 may include the dielectric films 12D and the light absorbing thin films 12M alternately disposed on each other or may include two or more types of dielectric film 12D continuously laminated on one another.

The dielectric film 12D is composed of a material transparent at least in the visible wavelength region. Examples of the material include Nb2O5, TiO2, Ta2O5, Al2O3, and SiO2. The half width of the reflection peak in each of the wavelength regions of the primary colors increases and decreases with the refractive index of the dielectric film 12D. A dielectric material suitable for the target reflection property may be selected accordingly.

The light absorbing thin film 12M having a transmitting property is preferably a thin film 5 to 20 nm in thickness composed of a material having a refractive index of 1 or more and an absorption coefficient of 0.5 or more. Examples of such a material include, Nb, Nb alloys, C, Cr, Fe, Ge, Ni, Pd, Pt, Rh, Ti, TiN, TiNxWy, Mn, Ru, and PbTe. The respective layers constituting the optical laminate 12 may be formed by a dry process, such as sputtering.

The thickness of each of the layers of the optical laminate 12 is designed so that a high reflection property, e.g., a reflectance of 50% or more, is exhibited with respect to the red, green, and blue wavelength regions while a high absorption property, e.g., an absorption of 80% or more, is exhibited with respect to light outside the red, green, and blue wavelength regions. In detail, the thickness of each of the layers of the optical laminate 12 is preferably designed to satisfy the following condition:

$$nd = \lambda(\alpha \pm 1/4) \tag{1}$$

wherein d is the thickness of each layer, n is a refractive index of each layer, λ is the wavelength of light incident on the optical laminate, nd is the optical thickness of each layer, and α is a natural number.

Figure 3:
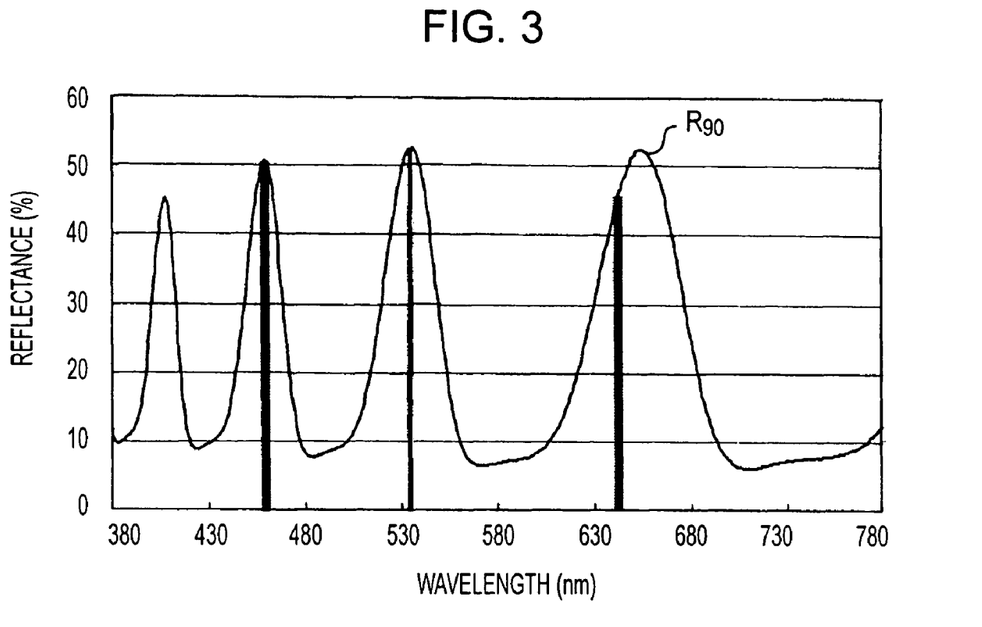
FIG. 3 is a graph showing the reflecting properties of the reflective sheet 1.

For example, as shown in FIG. 3, a reflective sheet 1 including an Al film (50 nm in thickness) as the metal film 11M and a three-layer structure Nb2O5/Nb/Nb2O5 (thickness: 560 nm/19 nm/550 nm (Al layer side)) as the optical laminate 12 can exhibit a high reflectance of at least 50% to light in the three primary color regions and a high absorption of at least 80% to light (stray light) near these regions with respect to projector light (light from a projector light source using a laser oscillator).

Figure 4:
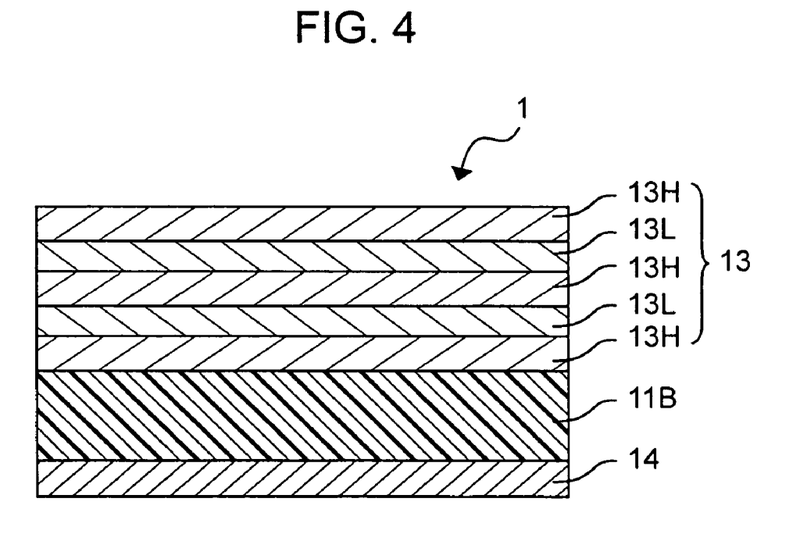
FIG. 4 is a cross-sectional view of optical films of a reflective sheet 1.

Another example of the structure of the reflective sheet 1 is shown in FIG. 4. This reflective sheet 1 includes the substrate 11B, an optical laminate 13, which is disposed on the substrate 11B, reflects light in the three primary color regions, and transmits light outside these regions in the projector light, and a light-absorbing layer 14 disposed at the back of the substrate 11B. The substrate 11B may be the same substrate as one shown in FIG. 2.

The optical laminate 13 is a laminate having a selective reflecting property and being formed by alternately stacking high refractive index layers 13H and low refractive index layers 13L having a reflectance lower than that of the high refractive index layers 13H.

The high refractive index layers 13H and the low refractive index layers 13L are formed by a dry process, such as sputtering, or a wet process, such as spin coating or dip coating.

In making these layers by a dry process, various materials having a refractive index of about 2.0 to about 2.6 may be used to form the high refractive index layers 13H, and various materials having a refractive index of about 1.3 to about 1.5 may be used to form the low refractive index layers 13L. For example, the high refractive index layers 13H may be composed of $TiO_2$, $Nb_2O_5$, or $Ta_2O_5$, and the low refractive index layers 13L may be composed of $SiO_2$ or $MgF_2$.

In making these layers by a wet process, the thicknesses of the layers of the optical laminate 13 may be designed by a matrix simulation so that the optical laminate exhibits a high reflecting property to light in particular wavelength regions and a high transmitting property to at least light in the visible wavelength region but outside those particular wavelength regions. Here, the "matrix simulation" refers to a technique disclosed in Japanese Unexamined Patent Application Publication No. 2003-270725. In detail, when light enters a laminated optical thin-film system, which is constituted from two or more materials to allow multiple reflection at the interfaces of the layers, at an incident angle of θ0, phases become coherent depending on the type and wavelength of the light source used and the optical thickness (the product of the refractive index and a geometric thickness of the layer) of each layer, and the reflected light beams thereby exhibit coherence. Based on this principle, an equation is established, and a simulation is conducted using this equation to design the thickness of the optical film having desired characteristics.

In this embodiment, red, green, and blue wavelength regions, which are used as the imaging light in the projector light source, may be selected as the particular wavelength regions, and the thickness of each layer may be determined by a matrix simulation so that only light in these wavelength regions is reflected and light outside these wavelength regions is transmitted. By stacking the high refractive index layer 13H and the low refractive index layer 13L having thicknesses designed as such, an optical laminate 13 that can satisfactorily function as an RGB spectrum filter can be reliably made.

The number of the optical layers constituting the optical laminate 13 formed by the dry process is not particularly limited. Preferably, the number is an odd number to provide a high refractive index layer 13H at the light incident side and another high refractive index layer 13H to be the outermost layer of the optical laminate 13 opposite to the light incident side.

When the optical laminate 13 is made by the wet process, the high refractive index layers 13H and the low refractive index layers 13L are respectively prepared by application of solvent-based paint materials, followed by curing. Preferably, an odd number of these layers are alternately stacked. Each optical layer is preferably formed by applying a paint material containing a resin curable by absorbing energy applied by heating or UV irradiation. For example, the high refractive index layers 13H are preferably prepared using a thermosetting resin, Opstar JN7102 (refractive index: 1.68) produced by JSR Corporation and the low refractive index layers 13L are preferably prepared using a thermosetting resin, Opstar JN7215 (refractive index: 1.41) produced by JSR Corporation. The resulting optical laminate 13 has flexibility.

The material for the high refractive index layers 13H is not limited to the above-described thermosetting resin. Any solvent-system paint material that can yield a refractive index of about 1.6 to 2.1 may be used. The material for the low refractive index layers 13L is not limited to the above-described thermosetting resin. Any solvent-system paint material that can yield a refractive index of about 1.3 to 1.59 may be used. The larger the difference in refractive index between the high refractive index layers 13H and the low refractive index layers 13L, the smaller the desirable number of layers to be formed.

When the optical laminate 13 is made by a wet process, the thickness of each of the layers of the optical laminate 13 is designed so that the optical laminate 13 exhibits a high reflecting property, e.g., a reflectance of 50% or more, to light in the red, green, and blue wavelength regions, and a high transmitting property, e.g., a transmittance of 80% or more, to light outside these wavelength regions. The thickness of each layer of the optical laminate 13 may be designed to satisfy equation (1) above.

For example, an optical laminate 13 constituted from nineteen layers including ten high refractive index layers 13H (thickness: 1023 nm, refractive index: 1.68, each) and nine low refractive index layers 13L (thickness: 780 nm, refractive index: 1.41, each) alternately stacked with high refractive index layers 13H at the top and bottom can exhibit a high reflectance of 80% or more to light in the three primary color regions and a high transmitting property, i.e., a reflectance of 20% or less, to light (stray light) near these regions with respect to projector light (light from a projector light source using a laser oscillator).

The light-absorbing layer 14 is a black coating layer formed by applying a black paint on the back of the substrate 11B, or is a black film bonded onto the back of the substrate 11B to absorb light. With this structure, reflection of light transmitted through the optical laminate 13 can be prevented since the light-absorbing layer 14 absorbs the light. Thus, only the light beams in the three primary color regions can be reliably reflected by the reflective sheet 1. Alternatively, the substrate 11B may contain a black paint or the like so as to form a black substrate 11B that functions as a light-absorbing layer.

Any of the structures of the reflective sheet 1 described above can reflect light in particular wavelength regions, i.e., light beams projected from a light source, at a high reflectance and absorb light (ambient light) outside the particular wavelength regions.

The light-scattering sheet 3 scatters the light reflected by the reflective sheet 1 to obtain scattered light.

Since the reflective screen incorporating the reflective sheet 1 reflects the light beams in the three primary color regions, a reflected image of the image delivered to screen is viewed by a user. In other words, the user sees only the reflected light beams of the image projected onto the reflective screen. However, when only reflective specular components are contained in the light reflected by the screen, a user will have difficulty of recognizing a satisfactory, natural image because of limited field of view, etc.

To overcome this difficulty, the reflective screen 90 is equipped with the light-scattering sheet 3 so that scattered light reflected by the reflective screen 90 can be delivered to the user. In other words, when the light-scattering sheet 3 is disposed on the reflective sheet 1 and the light is transmitted through the light-scattering sheet 3, only light beams in the particular wavelength regions are selectively reflected by the reflective sheet 1. The reflected light beams are scattered as they passes through the light-scattering sheet 3, thereby producing scattered reflected light in addition to the reflective specular components. Thus, both the reflective specular components and the scattered reflected light are delivered to the user from the reflective screen 90, thereby significantly improving the visual field characteristics. As a result, natural images can be delivered to the user.

The light-scattering sheet 3 is not particularly limited and may be any known sheet. For example, the light-scattering sheet 3 may be a layer containing rows of beads. Such a light-scattering sheet 3 made of beads allows designing of characteristics, such as high light-scattering characteristics to light of a particular wavelength region, by controlling various factors, such as type and size of the beads to be used. Moreover, a microlens array (MLA) may be used as the light-scattering layer.

The adhesive layer 4 is an adhesive layer for bonding the light-scattering sheet 3 onto the reflective sheet 1. The adhesive layer 4 may be composed of an acrylic adhesive having optical transparency.

A combinatory use of the reflective screen 90 including the reflective sheet 1 and a light source whose half width of the spectrum is small, such as a projector equipped with a laser oscillator as the light source (such as GLV) or with an LED, can achieve high contrast and high color reproducibility since the influence of the ambient light can be effectively reduced. For example, in the graph of FIG. 3, solid lines are drawn at 456 nm, 532 nm, and 643 nm, indicating typical laser wavelengths of GLV. Since the half width of the spectrum of the laser light is sufficiently smaller than the half width of the spectral characteristics of the reflective sheet 1, the influence of the ambient light can be eliminated.

In contrast, when light is projected onto the reflective screen 90 from an LCD projector incorporating a UHP lamp as the light source, part of the spectrum of the light source is also trimmed. This results in poor white balance of the reflected light.

Figure 5:
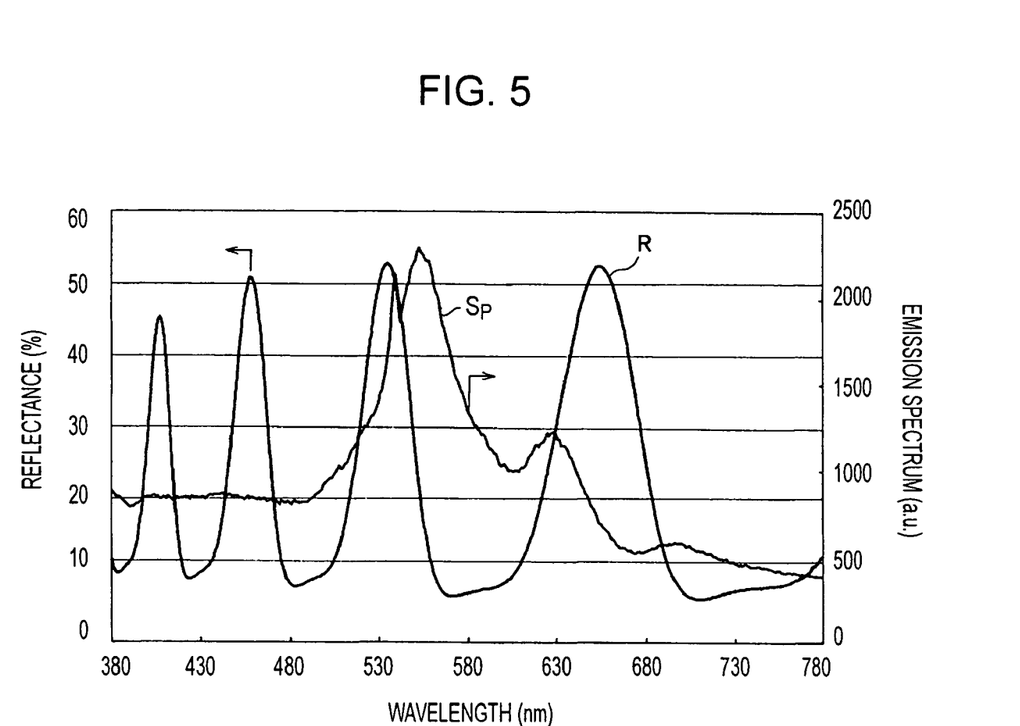
FIG. 5 is a graph showing an emission spectrum of a UHP lamp and a reflecting property of the reflective sheet 1.
Figure 6:
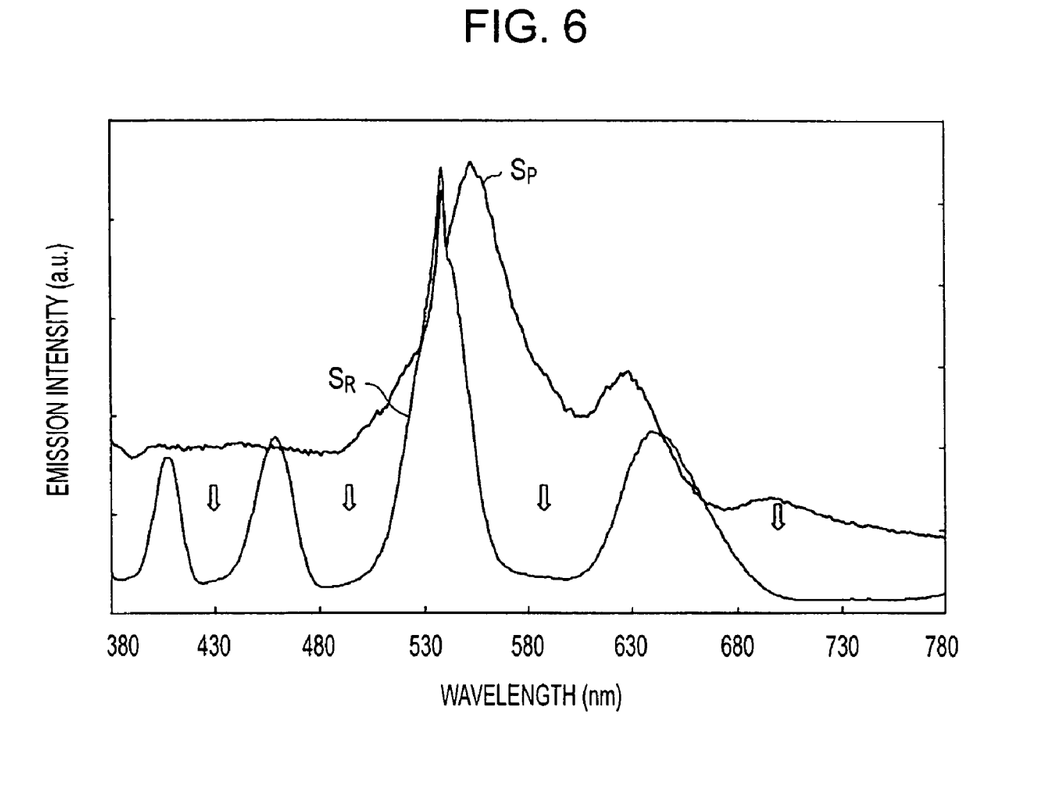
FIG. 6 is a graph showing the emission spectrum of the UHP lamp and a spectrum of light reflected by the reflective sheet 1.

An example is shown in FIGS. 5 and 6. FIG. 5 shows a reflectance curve R of the reflective sheet 1 shown in FIG. 3 and an emission spectrum curve SP of the white light from an LCD projector incorporating a UHP lamp. FIG. 6 shows an actual white spectrum reflected by the reflective screen 90 with respect to the reflection characteristics and the spectrum of the light source shown in FIG. 5. In the spectrum SR of the reflected light, the spectrum peak in the green wavelength region shows a markedly high intensity. Thus, white does not appear.

In the wavelength regions of the spectrum SR indicated by arrows in FIG. 6, projected light is not reflected. Thus, the purity of color can be increased, and the color gamut can be extended.

The present invention is directed to a screen constituent material containing a coloring material for correcting the shift of the chromaticity point described above.

Figure 7:
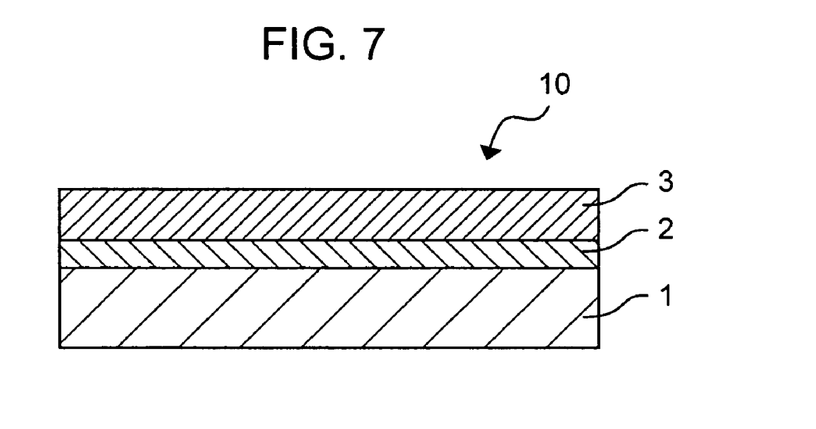
FIG. 7 is a cross-sectional view showing a reflective screen of a first embodiment.

FIG. 7 shows a reflective screen according to a first embodiment of the present invention.

A reflective screen 10 of this embodiment includes an adhesive layer 2 that corresponds to the adhesive layer 4 in FIG. 1. The adhesive layer 2 contains a coloring material that absorbs light in a particular wavelength region. Other features of the reflective screen 10 are identical to those shown in FIG. 1. The reflective sheet 1 is bonded to the light-scattering sheet 3 via the adhesive layer 2.

The adhesive layer 2 has an adhesive property that enables bonding of the reflective sheet 1 and the light-scattering sheet 3 and exhibits low transmittance to light in a particular wavelength region. Accordingly, a coloring material that absorbs light in the particular wavelength region is added and dispersed in the adhesive layer 4 to form the adhesive layer 2. The particular wavelength region is preferably one of the wavelength regions in which the reflective sheet 1 shows high reflecting properties, and more preferably a green wavelength region. The light in the "green wavelength region" is light having a wavelength of 525 to 580 nm, and preferably 525 to 560 nm.

The coloring material may be any pigment or dye and is preferably a magenta material that absorbs green light.

Examples of the coloring materials include coloring materials having high absorption near 532 nm, in particular, in the 525 to 560 nm region. Examples of such materials include cyanine, squalirium, azomethine, xanthene, oxonol, and azo compounds. Cyanine compounds are preferred, and cyanine compounds represented by structural formula (A) below are more preferred:

(A)

These coloring materials have an absorption maximum in the range of 550 to 620 nm, i.e., the orange light region including neon light, which absorbs green light.

Other examples of preferable pigments include pigment reds (PR), such as dichloroquinacridone (PR209) represented by the following formula:

This coloring material has the minimum transmittance at 540 nm (minimum transmittance wavelength) in the 525 to 560 nm wavelength region. The transmittance thereat is smaller than that in the blue wavelength region and that in the red wavelength region.

Yet other examples of the coloring material having similar properties include diketopyrrolopyrrole (PR254) having a minimum transmittance wavelength of 544 nm and dimethylquinacridone (PR122) having a minimum transmittance wavelength of 510 nm.

A material that may be added to the adhesive layer 2 may be metal fine particles, metal-coated fine particles, or the like that absorb green light. For example, gold colloid having a minimum transmittance wavelength of 529 nm may be added to the adhesive layer 2.

The amount of the coloring material added to the adhesive layer 2, the thickness of the adhesive layer 2, and the like may be determined according to the target transmittance in the target wavelength region.

Figure 8:
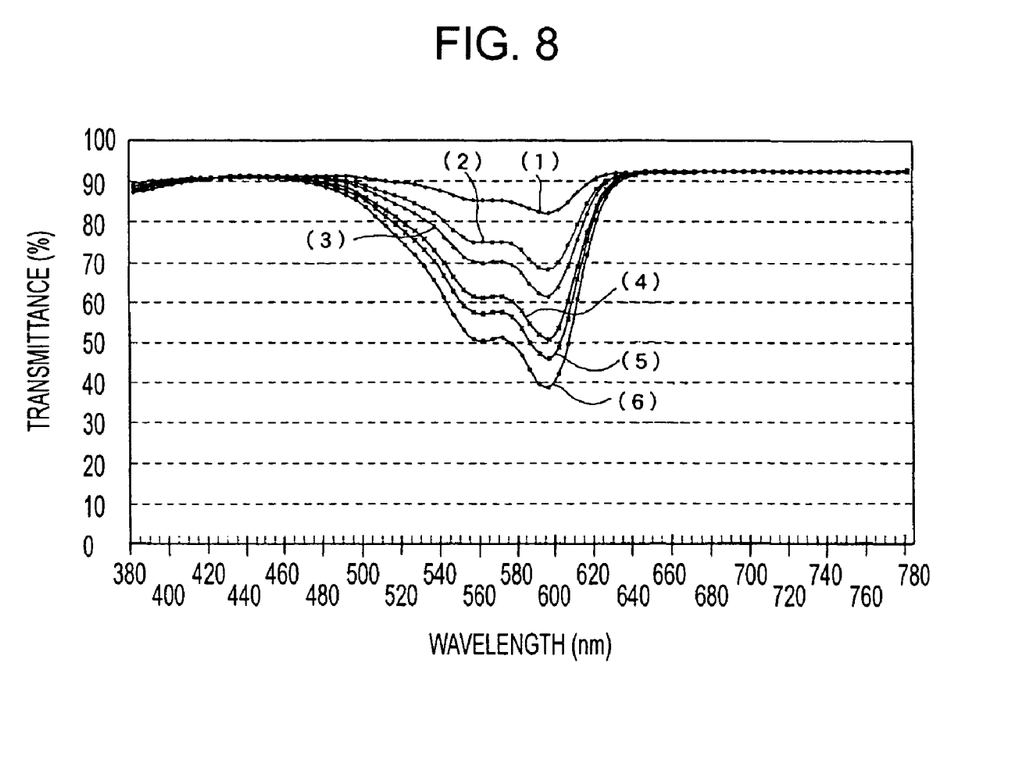
FIG. 8 is a graph showing a light absorbing property of an adhesive layer containing a coloring material.

The light transmitting properties of adhesive layers containing a cyanine compound represented by formula (A) are shown in FIG. 8. In the graph, the content of the coloring material is increased in the ascending order for samples (1) to (6) all having a thickness of 25 μm. In particular, samples (1) to (6) are prepared by changing the amount of the coloring material dispersed in an acrylic resin.

The graph in FIG. 8 shows tendency of the transmittance decreasing near 560 nm as the content of the coloring material is increased. A transmittance of less than 50% is reported in sample (6). When the adhesive layer 2 contains the coloring material in an amount below that of sample (6), the transmitted light becomes reddish. For samples (1) to (3), the transmitted light becomes greenish. According to the experiment conducted herein, transmitted light in samples (4), (5), and (6) exhibits suitable white balance.

If a smaller thickness is desired, the content of the coloring material may be increased to yield the same transmittance.

The adhesive layer 2 is preferably a film having a high transmittance in the red wavelength region. This is preferable because the light absorption by the adhesive layer 2 can correct the imbalance between the excessive spectrum intensity in the green wavelength region and the insufficient spectrum intensity in the red wavelength region for the light source such as a UHP lamp.

Light beams of particular wavelengths from a projector are reflected at the reflective screen 10, and incident light, such as ambient light, in other wavelength regions are transmitted and absorbed, thereby achieving selective reflection. At the same time, the intensities of reflected light beams in the RGB wavelength regions can be satisfactorily balanced, thereby reducing the black level and increasing the contrast of the image on the reflective screen 10. It becomes possible to display images having high contrast and high color reproducibility even in well-lit rooms.

With respect to light incident on the reflective screen 10, part of light in a particular wavelength region (the green light when a UHP lamp is concerned) is absorbed as the light passes through the adhesive layer 2. The remaining portion of the light reaches the reflective sheet 1, and ambient light components contained in the incident light is absorbed by the reflective sheet 1. Only the light in particular wavelength regions (typically, the wavelength regions of three primary colors, RGB) that form images are selectively reflected. As the reflected light passes through the adhesive layer 2, some of the light in a particular wavelength region (green light when a UHP lamp is concerned) is absorbed, and light in the red wavelength region is transmitted at high transmittance, resulting in well-balanced emission intensity. The light is scattered at the surface of the light-scattering sheet 3, and imaging light with a wide viewing angle is delivered to the user. Thus, The reflective screen 10 can highly eliminate the influence of the ambient light on the imaging light, i.e., the reflected light. The contrast can be increased to a remarkably high level, and an image having high color reproducibility can be delivered to the user.

Figure 9:
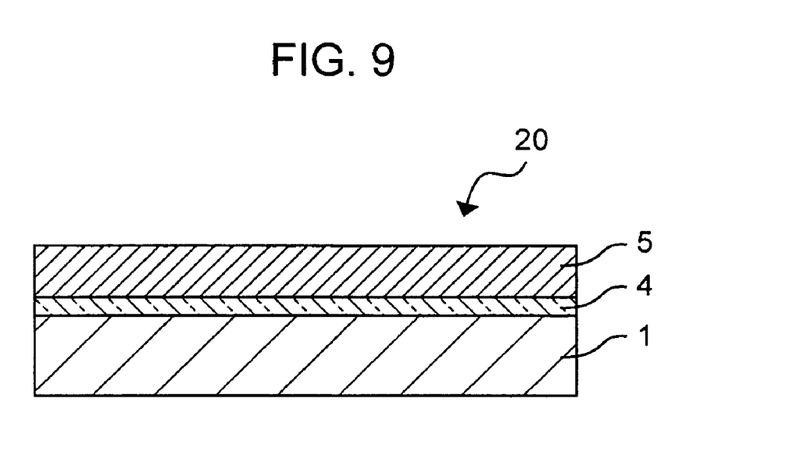
FIG. 9 is a cross-sectional view showing a reflective screen of a second embodiment.

A reflective screen 20 according to a second embodiment of the present invention is shown in FIG. 9. The reflective screen 20 includes a light scattering sheet 5 as the light-scattering sheet 3 in FIG. 3. The light scattering sheet 5 contains a coloring material that absorbs light in a particular wavelength region. Other features of the reflective screen 20 are identical to those of FIG. 1. The reflective sheet 1 is bonded to the light scattering sheet 5 with the adhesive layer 4.

The light scattering sheet 5 scatters light reflected by the reflective sheet 1 and has low transmittance to light in a particular wavelength region. Thus, a coloring material that absorbs light in a particular wavelength region is added and dispersed in the light-scattering sheet 3 to prepare the light scattering sheet 5. Here, the light to be absorbed is preferably within one of the particular wavelength regions in which the reflective sheet 1 shows a high reflecting property, and more preferably light in the green wavelength region. The light in the "green wavelength region" is light having a wavelength of 525 to 580 nm, and preferably 525 to 560 nm.

The coloring material added to yield such a property may be the same as those listed in the first embodiment. As in the first embodiment, the content of the coloring material may be adjusted based on the target transmittance.

With respect to light incident on the reflective screen 20, part of light in a particular wavelength region (the green light when a UHP lamp is concerned) is absorbed as the light passes through the light scattering sheet 5. The remaining portion of the light reaches the reflective sheet 1, and ambient light components contained in the incident light are absorbed by the reflective sheet 1. Only the light in particular wavelength regions (typically, the wavelength regions of three primary colors, RGB) that form images are selectively reflected. As the reflected light passes through the light scattering sheet 5, some of the light in a particular wavelength region (green light when a UHP lamp is concerned) is absorbed, and light in the red wavelength region is transmitted at high transmittance, resulting in well-balanced emission intensity. The light is scattered at the surface of the light scattering sheet 5, and imaging light with a wide viewing angle is delivered to the user. Thus, the reflective screen 20 can highly eliminate the influence of the ambient light on the imaging light, i.e., the reflected light. The contrast can be increased to a remarkably high level, and an image having high color reproducibility can be delivered to the user.

Although the reflected sheets described above have selective reflecting properties, a reflective sheet prepared by depositing aluminum on the substrate may be used instead.

EXAMPLE

The present invention will now be described by way of Examples. These examples are for the illustrative purposes only and do not limit the scope of the present invention.

Example

A reflective screen having the structure shown in FIG. 7 was prepared under the following conditions:

(1) Reflective Sheet 1

A reflective sheet 1 shown in FIG. 2 was prepared by sputtering.

(a) Reflective layer 11

Substrate 11B: a PET film (188 μm in thickness)

Metal film 11M: Al film (50 nm in thickness)

(b) Optical laminate 12: Nb2O5/Nb/Nb2O5 (thickness: 560 nm/19 nm/550 nm (Al layer side))

(2) Adhesive Layer 2

An acrylic resin was used as the base resin, and a cyanine compound represented by structural formula (A) was used as the coloring material. The content of the coloring material was the same as sample (6) shown in FIG. 8.

(3) Light-Scattering Sheet 3

An epoxy resin layer was formed on a PET film, and by using a master die carrying a surface texture prepared in advance, irregularities were transferred onto the epoxy resin layer.

The resulting light-scattering sheet 3 was bonded onto the surface of the reflective sheet 1 using the adhesive layer 2 to prepare a reflective screen.

A comparative example of a reflective screen was prepared as in Example described above except that the adhesive layer was composed of only the acrylic resin and no coloring material was added to the adhesive layer.

Figure 10:
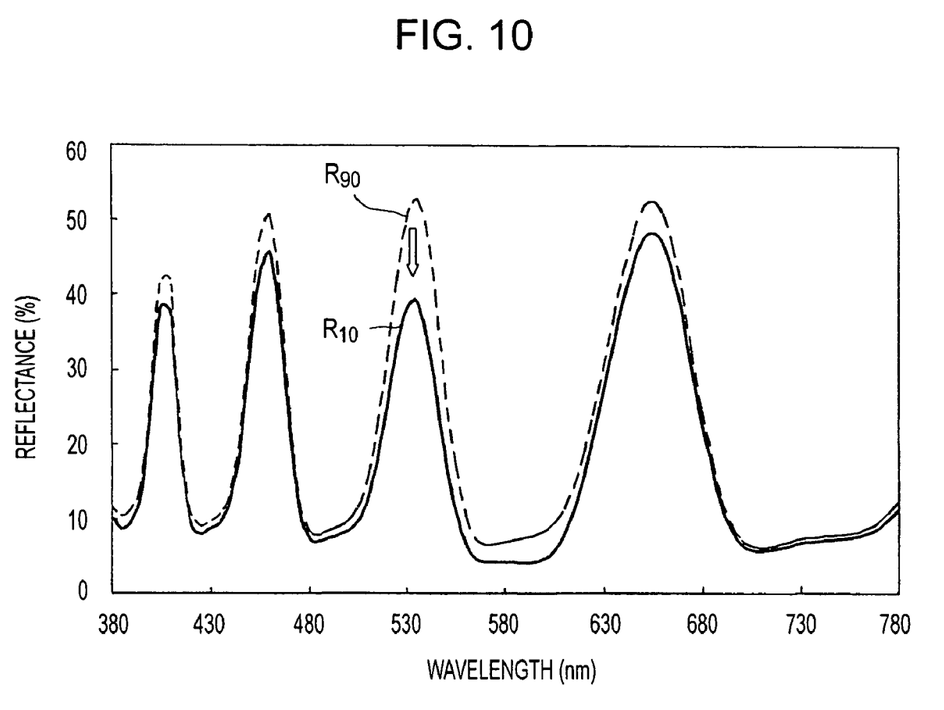
FIG. 10 is a graph showing reflecting properties of reflective screens of Example and Comparative Example.

The reflecting properties of the reflective screens of Example and Comparative Example were analyzed and the results are shown in FIG. 10. The reflectance curve of Example is marked as R10, and the reflectance curve of Comparative Example is marked as R90. The reflectance of the green light was lower in Example than in Comparative Example.

Imaging light was projected onto the reflective screen from a projector incorporating an UHP lamp. Images were displayed with high contrast and high color reproducibility. White light was projected from the projector to measure the spectrum of the reflected light. The spectrum of the reflected light of Example showed well-balanced spectrum intensities between red, green, and blue wavelength regions compared with that of Comparative Example.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A reflective screen that displays an image by reflecting light from a light source, the reflective screen comprising:
a reflective sheet;
a light-scattering sheet; and
an adhesive layer bonding the reflective sheet to the light-scattering sheet,
wherein at least one of the adhesive layer or the light-scattering sheet contains a coloring material that absorbs light in a particular wavelength region from the light source,
wherein the reflective sheet has high reflecting properties to light in particular wavelength regions and absorbing properties to light in a visible wavelength region outside the particular wavelength regions,
wherein the reflective sheet comprises an optical laminate including a dielectric layer and a light-absorbing thin film having a transmitting property; and a reflecting layer for reflecting light transmitted through the optical laminate, and
wherein the thickness of each of the layers of the optical laminate is configured with respect to a reflectance of 50% or more, is exhibited with respect to red, green, and blue wavelength regions, and an absorption of 80% or more, is exhibited with respect to light outside the red, green, and blue wavelength regions, wherein the thickness of each of the layers of the optical laminate is configured to satisfy the following condition:

$nd=\gamma(\alpha \pm \frac{1}{4})$ wherein d is the thickness of each layer, n is a refractive index of each layer, $\gamma$ is the wavelength of light incident on the optical laminate, nd is the optical thickness of each layer, and $\alpha$ is a natural number.

2. The reflective screen according to claim 1, wherein the coloring material absorbs green light.

3. The reflective screen according to claim 1, wherein the reflective sheet comprises an optical laminate including at least one high refractive index layer and at least one low refractive index layer alternately disposed, the low refractive index layer having a refractive index lower than that of the high refractive index layer; and an absorbing layer that absorbs light transmitted through the optical laminate.

4. The reflective screen according to claim 1, wherein the particular wavelength regions respectively include a red wavelength region, a green wavelength region, and a blue wavelength region.

5. The reflective screen according to claim 1, wherein the light absorbing thin film material having a refractive index of 1 or more and absorbing coefficient of 0.5 or more.

6. The reflective screen according to claim 1, wherein the optical laminate further comprising a three-layer structure $Nb_2O_5/Nb/Nb_2O_5$.

7. The reflective screen according to claim 1, further comprising at least one of metal fine particles or metal-coated fine particles added to the adhesive layer.

8. The reflective screen according to claim 1, wherein at least one of the adhesive layer or the light-scattering sheet has transmittance from 50% to 60% at wavelength of 560 nm.

9. The reflective screen according to claim 1, wherein the light source is a high-pressure mercury lamp.

10. A reflective screen that displays an image by reflecting light from a light source, the reflective screen comprising:
a reflective sheet;
a light-scattering sheet; and
an adhesive layer bonding the reflective sheet to the light-scattering sheet,
wherein at least one of the adhesive layer or the light-scattering sheet contains a coloring material that absorbs light in a particular wavelength region from the light source, and
wherein the coloring material selected from group consisting of cyanine, squalirium, azomethine, xanthene, oxonol, and azo compounds has an absorption maximum ranging from 550 nm to 620 nm.

11. A reflective screen that displays an image by reflecting light from a light source, the reflective screen comprising:
a reflective sheet;
a light-scattering sheet; and
an adhesive layer bonding the reflective sheet to the light-scattering sheet,
wherein at least one of the adhesive layer or the light-scattering sheet contains a coloring material that absorbs light in a particular wavelength region from the light source, and
wherein the coloring material is selected from group consisting of dichloroquinacridone, diketopyrrolopyrrole, and dimethylquinacridone.

* * * * *